UNITED STATES PATENT OFFICE.

LUDWIG H. REUTER, OF NEW YORK, N. Y.

PROCESS OF MAKING ALKYL ETHERS OF MORPHIN.

No. 842,011.　　　　Specification of Letters Patent.　　　　Patented Jan. 22, 1907.

Application filed March 19, 1906. Serial No. 306,909.

*To all whom it may concern:*

Be it known that I, LUDWIG H. REUTER, a subject of the King of Bavaria, residing at the borough of Brooklyn, in the city of New York and State of New York, have invented a new and useful Process of Making Alkyl Ethers of Morphin, of which the following is a specification.

My invention relates to an improved process for preparing any for the alkyl ethers of morphin—such as codein, &c.—the principal objects being to provide a method which can be carried out without incurring a loss of a material proportion of morphin by oxidation and to provide for the action of the alkylizing agent or agents upon the major portion of the morphin employed, thus avoiding the enormous losses which have heretofore been necessary in all methods of manufacturing alkyl ethers of morphin of which I am aware.

In the methods heretofore known the quantities of codein or other product to be obtained, which from the molecular formulas might be assumed to be produced, have never been obtained, owing, chiefly, to the fact that a part of the morphin is oxidized in alkaline solution and converted into products which are practically worthless and of course result in a loss of valuable material, and, secondly, because the sodium hydrate which is used in many of these processes has a decomposing effect on alkalyzing agents, such as trimethyl phosphate and methyl nitrate, respectively, converting them into methyl alcohol and sodium methyl phosphate and nitrate, respectively. Obviously not much codein can be formed under such conditions.

In other processes in which morphin hydrate is employed decompositions necessarily take place which do not allow the formation of large yields of codein.

In order to prevent the oxidation of morphin, I have adopted several methods. For example, I have passed carbon-monoxid gas previously dried and freed from carbonic acid into a container holding the alkaline morphin solution, thereby excluding all the air from the container in which the conversion of morphin into codein is carried on. This reduced the oxidation of morphin by about twenty per cent. I have also secured a reduction in oxidation by using hydrogen gas carefully dried and freed from carbonic acid and by using air freed from oxygen; but in none of these cases have I succeeded in cutting down the oxidation of the morphin more than one-half of that experienced ordinarily in the synthesis of alkyl derivatives of morphin. I have discovered, however, that a number of organic substances known for their reducing power especially in alkaline solution when added in small proportions to the alkylizing agent produce most remarkable effects and that the non-converted morphin can be almost quantitatively recovered without loss on account of oxidation, only such a very slight loss being incurred as is due to the various digesting, extracting, evaporating, and other processes to which the morphin solutions are subjected. Among the agents which can be used for this purpose with satisfactory results are the organic esters of the several alkyls, especially pure alkyl oxalates.

I have found that the methyl oxalate, being a solid and odorless substance which crystallizes from benzene in beautiful large crystals and can be manufactured at a low price in pure condition, is an article of great stability and can be easily weighed and handled. I have discovered also that it possesses two great advantages and performs two functions—namely, it prevents the oxidation of morphin in alkaline solutions in processes of this character, and it acts as an alkylizer, (methylizer.) The use of these oxalates when added in small proportions of from five to ten parts to one hundred parts of any of the well-known alkylizing agents, such as the nitrates or sulfates of alkyl, prevents the oxidation of morphin, and the nonconverted portion of morphin is recoverable almost quantitatively in pure condition, consequently being much lighter in color than usual and capable of use in new operations without further purification. Anhydrous salts of pyrogallic acid, sulfites, and sodium oxymethyl sulfonate also prevent the oxidation of morphin. I have discovered also that for the purpose of getting large yields of codein it is necessary to use exclusively anhydrous materials—for instance, a mixture of methyl oxalate with trimethyl phosphate or of methyl oxalate with dimethyl sulfate only in connection with anhydrous materials—such as anhydrous morphin, anhydrous methyl or ethyl alcohol, and anhydrous alkali, such as sodium methylate or alcoholate. In this connection it may be stated that this point in my process differs from certain of those heretofore known on account of their using morphin hydrate and sodium hydrate in connection with the methylizing agent, both of which would introduce elements which it is my purpose to avoid. Neither morphin hydrate nor sodium hydrate nor any other hydrate compound nor alcohol containing moisture can be efficiently employed in my process, as the water would first decompose the sodium methylate or alcoholate, and the sodium hydrate thus formed would decompose my alkylizing agent comprising oxalate and dimethyl sulfate.

In general it may be stated that the preferred way of carrying out my process involves the treatment of anhydrous morphin dissolved in an anhydrous methyl or ethyl alcohol with a dry alkali methylate or in some cases alcoholate or other similar composition containing an alkali metal in the presence of an alkylizing agent consisting of an inorganic acid ester of an alkyl and a small proportion of a neutral organic oxygen acid ester of an alkyl.

As an example of manufacture I dissolve one thousand parts, by weight, of morphin which has been made anhydrous by entirely removing the six per cent. of water of crystallization it contained, which can be done by drying in a vacuum drying apparatus at as low a temperature as possible, preferably not above 50° to 60° centigrade, together with one hundred and eighty-eight parts, by weight, of dry sodium methylate or the proportionate quantity of dry sodium alcoholate, which is formed when metallic sodium is dissolved in alcohol, three parts, by weight, of anhydrous methyl oxalate and forty parts of anhydrous dimethyl sulfate in seven thousand parts, by weight, of anhydrous methyl or ethyl alcohol and digest the mixture until the reaction is finished—that is, until the quantities of codein and morphin, as found by analysis of samples taken from time to time, remain constant. The codein formed is separated in the usual way, while the nonconverted morphin is recovered practically quantitatively and free from oxidation products. I also find that when neutral inorganic acid esters of an alkyl, as dimethyl sulfite or trimethyl phosphite, are used with or without dimethyl sulfate the same dry anhydrous condition should be preserved to secure the highest efficiency in the process.

Instead of the dimethyl sulfate or in connection with it, methyl nitrate, trimethyl phosphate, and dimethyl sulfite or other materials for preventing the oxidation of morphin can be used with dry anhydrous materials, of course.

While I have described my invention as carried out with the use of certain chemical compounds, I am aware that modifications may be made in the process by the substitution of other chemical substances for accomplishing the same result by any person skilled in the art without departing from the scope of the invention as expressed in the claims. Therefore I do not wish to be limited to the exact substances mentioned; but What I do claim, and desire to secure by Letters Patent, is—

1. A process of manufacturing anhydrous alkyl ethers of morphin, which comprises treating a solution of anhydrous morphin with an anhydrous alkylizing agent all materials and products being anhydrous.

2. A process of making alkyl ethers of morphin, which comprises the treatment of a solution of anhydrous morphin with an alkylizing agent in the presence of an organic ester of an alkyl, all materials and products being anhydrous.

3. A process of making alkyl ethers of morphin, which comprises the treatment of a solution of anhydrous morphin with an alkylizing agent in the presence of methyl oxalate, all materials and products being anhydrous.

4. A process of manufacturing alkyl ethers of morphin, which comprises treating anhydrous morphin dissolved in an anhydrous alcohol with an anhydrous inorganic acid ester of an alkyl and an anhydrous neutral organic oxygen acid ester of an alkyl.

5. A process of manufacturing alkyl ethers of morphin, which comprises treating anhydrous morphin dissolved in an anhydrous alcohol with an anhydrous neutral alkyl ester of sulfuric acid and an anhydrous alkyl ester of oxalic acid in the presence of sodium.

6. A process of manufacturing alkyl ethers of morphin, which comprises treating with a mixture of methyl oxalate and an alkyl sulfate, a solution of anhydrous morphin in an anhydrous alcohol in the presence of a substance containing alkali metal.

7. A process of manufacturing alkyl ethers of morphin, which comprises dissolving anhydrous morphin in an anhydrous alcohol in the presence of a substance containing sodium, and then acting on that solution with a mixture of anhydrous methyl oxalate and anhydrous dimethyl sulfate.

8. A process of manufacturing alkyl ethers of morphin, which comprises dissolving anhydrous morphin in an anhydrous alcohol in the presence of a substance containing an alkali metal, and then acting on that solution with anhydrous dimethyl sulfate in the presence of a substance for preventing the oxidation of the morphin.

9. A process of manufacturing alkyl ethers of morphin, which comprises the addition of an anhydrous alkyl oxalate to an anhydrous alkylizing agent and treating anhydrous morphin therewith.

10. A process of manufacturing alkyl ethers of morphin, which comprises the treatment of a solution of anhydrous morphin with an alkylizing agent in the presence of a substance for preventing the oxidation of the morphin, all materials and products being anhydrous.

11. A process of manufacturing alkyl ethers of morphin, which comprises the treatment of a solution of anhydrous morphin with an alkylizing agent in the presence of a substance for preventing the oxidation of the morphin and for assisting in the alkylizing action all materials and products being anhydrous.

12. A process of manufacturing alkyl ethers of morphin, which comprises the treatment of a solution of anhydrous morphin with dimethyl sulfate in the presence of a substance for preventing the oxidation of the morphin all materials and products being anhydrous.

13. A process of manufacturing alkyl ethers of morphin, which comprises the treatment of anhydrous morphin dissolved in an anhydrous alcohol with an anhydrous substance containing an alkali metal in the presence of an alkylizing agent, consisting of an inorganic acid ester of an alkyl, and a neutral organic acid ester of an alkyl.

14. A process of preparing alkyl ethers of morphin, which comprises acting upon anhydrous morphin by an anhydrous alkylizing agent in the presence of an anhydrous organic reducing agent.

In testimony whereof I have hereunto set my hand in the presence of two subscribing witnesses.

LUDWIG H. REUTER.

Witnesses:
 LEIGH DORNBURGH,
 CELIA STEINBERG.